US007884961B2

(12) United States Patent
Fujikura et al.

(10) Patent No.: US 7,884,961 B2
(45) Date of Patent: Feb. 8, 2011

(54) IMAGE FORMING APPARATUS WITH OPTIONAL ROUTINE ACTIVATED BY MEMORY KEY

(75) Inventors: Akira Fujikura, Chuo-ku (JP); Tetsuya Yoshioka, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 988 days.

(21) Appl. No.: 11/727,264

(22) Filed: Mar. 26, 2007

(65) Prior Publication Data

US 2008/0002221 A1    Jan. 3, 2008

(30) Foreign Application Priority Data

| Mar. 24, 2006 | (JP) | ............................. 2006-084267 |
| Mar. 24, 2006 | (JP) | ............................. 2006-084268 |
| Mar. 24, 2006 | (JP) | ............................. 2006-084269 |
| Mar. 24, 2006 | (JP) | ............................. 2006-084270 |

(51) Int. Cl.
*G06F 3/12*      (2006.01)
*G06K 15/00*   (2006.01)
*G06F 21/00*   (2006.01)

(52) U.S. Cl. ...................... 358/1.15; 358/1.1; 358/1.13; 358/1.14; 358/1.16; 705/51; 705/52; 705/53; 705/54; 705/59

(58) Field of Classification Search ................. 358/1.1, 358/1.13, 1.14, 1.15, 1.16; 714/5, 42, 48, 714/49, 55; 726/1–31; 705/51, 52, 53, 54, 705/59; 235/382; 340/5.25
See application file for complete search history.

(56) References Cited

U.S. PATENT DOCUMENTS

| 5,694,222 | A  | * | 12/1997 | Yamada ...................... 358/296 |
| 5,999,766 | A  | * | 12/1999 | Hisatomi et al. .............. 399/80 |
| 6,026,258 | A  | * | 2/2000  | Fresk et al. .................... 399/87 |
| 7,151,611 | B2 | * | 12/2006 | Sesek ......................... 358/1.13 |
| 7,254,354 | B2 | * | 8/2007  | Hirano ......................... 399/80 |
| 7,296,298 | B2 | * | 11/2007 | Salgado ....................... 726/30 |
| 7,415,217 | B2 | * | 8/2008  | Hirano ........................ 399/80 |
| 2002/0012129 | A1 | * | 1/2002 | Amemiya .................. 358/1.14 |
| 2004/0080771 | A1 | * | 4/2004 | Mihira et al. ............. 358/1.13 |
| 2007/0081186 | A1 | * | 4/2007 | Numata ..................... 358/1.15 |
| 2008/0028476 | A1 | * | 1/2008 | Salgado ....................... 726/30 |

FOREIGN PATENT DOCUMENTS

JP       2003-58986 A       2/2003

\* cited by examiner

*Primary Examiner*—Twyler L Haskins
*Assistant Examiner*—Dennis Dicker
(74) *Attorney, Agent, or Firm*—Browdy and Neimark, PLLC

(57) ABSTRACT

Following the insertion of a trial key or a license key into a port, authentication thereof is executed (S4, S22); if the trial key authentication is successful, a trial time limit is obtained by adding a trial permission period to a current time and is stored into a nonvolatile memory (S25); if the current time exceeds the trial time limit (S12, S13), or the license key authentication is successful, the trial state information is changed to indicate "trailed" (S4); if the license key authentication is successful (S14), or the trial key authentication is successful (S15) and the trial state information does not indicate "trailed" (S16), an optional routine is executed following an instruction from a control panel. In that routine, if the trial state information does not indicate "trailed", the trial time limit is displayed on a control panel.

24 Claims, 7 Drawing Sheets

FIG2.A
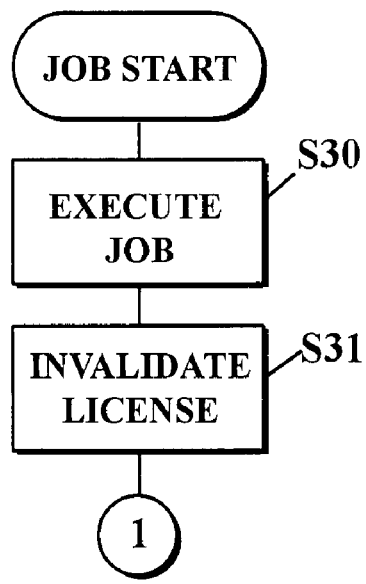
FIG2.B
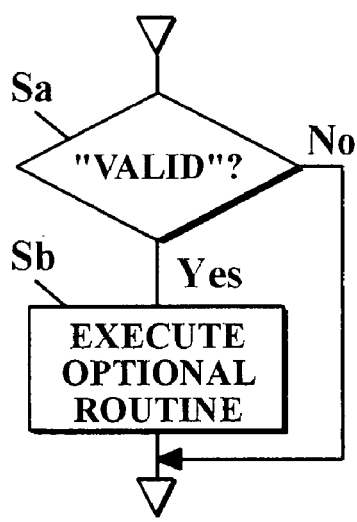
FIG2.C
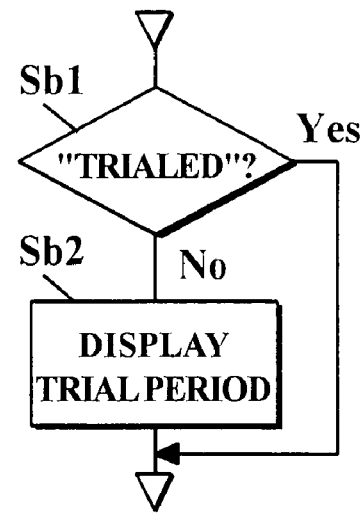

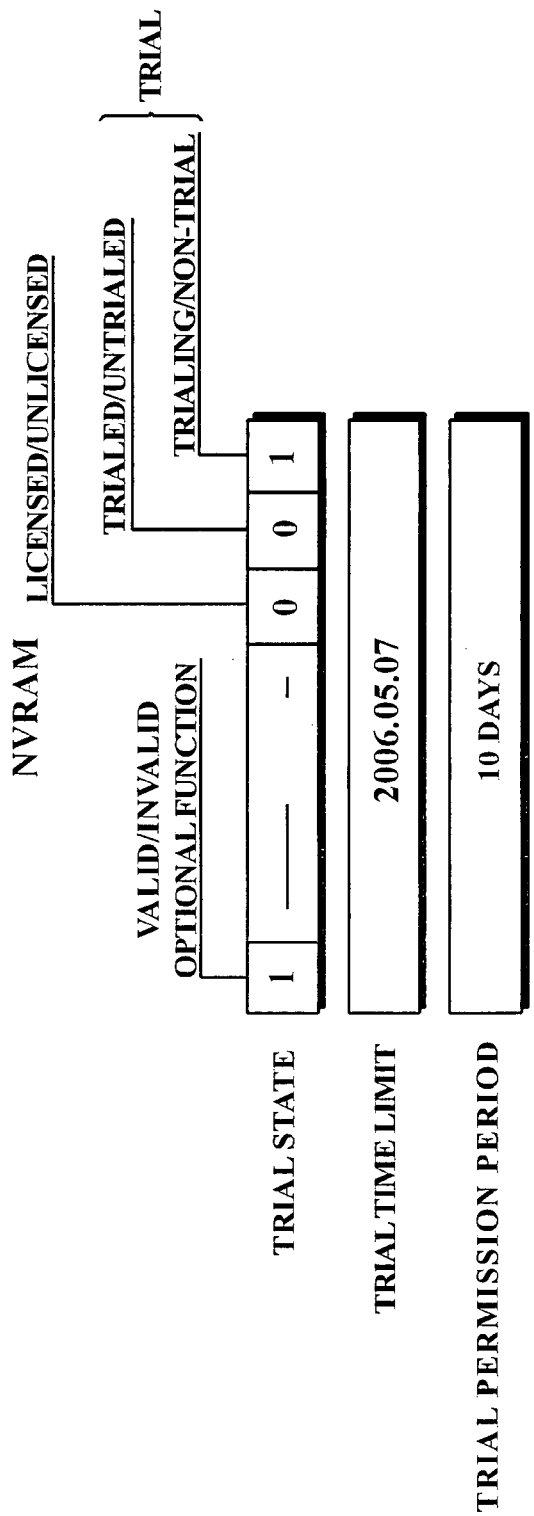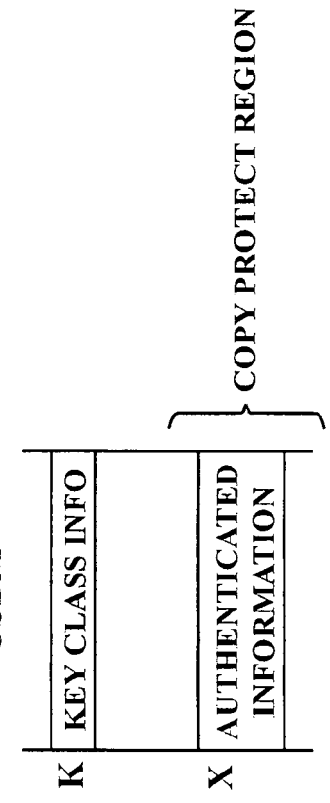

ized to an application from the hard disk. In the above cases, the user must visit a vendor each time to have the service personnel to perform the jobs, or the user must order an SD card from a vendor and wait a while before the SD card actually arrives at the user.

IMAGE FORMING APPARATUS WITH OPTIONAL ROUTINE ACTIVATED BY MEMORY KEY

CROSS-REFERENCE TO RELATED APPLICATIONS

This application is based upon and claims the benefit of priority from the prior Japanese Patent Application No. from 2006-084267 to 2006-084270, filed on Mar. 24, 2006, the entire contents of which are incorporated herein by reference.

TECHNICAL FIELD

The present invention generally relates to an image forming apparatus, such as a printer, a copier, a facsimile machine, or a multifunction peripherals, that carries a sheet to form an image thereon, and more specifically to an image forming apparatus activating an optional routine by using a removable memory such as a USB memory as a key.

BACKGROUND OF THE INVENTION

The convenience of an image forming apparatus can be improved by adding new function to an existing application. In a general computer, this object can be easily achieved by installing an updated version of an existing application from a CD-ROM.

However, in an image forming apparatus, since service personnel perform this job, its cost is high.

JP No. 2003-58486-A discloses a method including the steps of: installing an optional routine in a hard disk beforehand; invalidating the use of the optional routine; determining, when a SD (Secure Digital) card key in which ID data and encrypted data are written is inserted in an image forming apparatus, whether these sets of data are valid; and if so, validating the optional routine.

However, if a user does not actually try the optional routine before purchase it, the user may not be convinced that the user's job efficiency can be improved by using the optional routine. Therefore, the user may be hesitant to purchase the SD card, or may not use the optional routine even if the user purchases the SD card. In order for the user to confirm the efficiency of the optional functions, the user needs to visit a selling company or an exhibition of a new product to try optional function.

Problems also exist since the time when a user desires to try the optional function may differ for every user, due to a nature of the user's job. In other words, even if a user can make a trial of the optional function for a certain period after the user's purchase of an image forming apparatus, this period and the timing of the user's desire to use the optional function may not match.

Further, another problem can exist even if it is indicated that a user can make a trial of the optional function on a control panel. If a trial period elapses during a user's job or at the time when the user presses a job start button on for the optional function, the optional routine will be terminated or not be executed, possibly giving an unpleasant feeling to the user.

In addition, a trial period can be unduly extended if the time of a clock in an image forming apparatus is changed during the trial period. This can result in a decrease in sales of a license to the optional function.

Moreover, when moving from a trial use to a perpetual license use, both the trial and perpetual license use execute the same optional function; thus, the transition from the trial to the perpetual license use must be smoothly completed without confusing a user.

SUMMARY OF THE INVENTION;

Accordingly, it is an object of the present invention to provide an image forming apparatus capable of allowing a user to easily try optional function at a user's desired period with limiting a trial period as well as the number of trials.

Another object of the present invention is to provide an image forming apparatus capable of properly managing a trial period.

Yet another object of the present invention is to provide an image forming apparatus capable of smoothly moving from a trial use to a perpetual license use after purchasing a license.

In a first aspect of the present invention, an application orders a processor to perform the steps of:

(a) determining whether trial start information is input;

(b) executing an optional routine according to an instruction from instruction inputting means if the determination at the step (a) is positive and trial state information does not indicate "trialed"; and (c) determining whether an attempted trial exceeds a limitation indicated by trial limitation information, and if the determination is positive, having the trial state information indicate "trialed".

With the above configuration, a user can make a trial of the optional function by inputting the trial start information into the image forming apparatus at the user's desired time without visiting a vendor, leading to improved convenience for the user. Moreover, vendors can enjoy increased profits since a probability of the user's purchase of a license key increases after a trial period.

Further, if the trial state information is stored in the trial information storing means in the image forming apparatus and the trial state information indicates "trialed", an undue use of trial function of extending a trial period can be prevented because a trial cannot be made even if the trial start information is input. Therefore, a probability of a purchase of a license key increases after the trial and profits of a vendor increase.

In a second aspect of the present invention, an application orders a processor to perform the steps of:

(a) updating the trial state information based on a comparison of a trial time limit indicated by trial time limit information and a current time, between a start of the application and a start of a job, and every time a job is terminated; and (b) executing an optional routine following an instruction from the instruction inputting means if the trial state information indicates "valid".

With the above configuration, the trial period can be managed and limited properly every time a job is finished, even if a power source is always turned on. Thereby, even if the trial period is over when execution of a job starts or during the execution of the job, the execution of the job is guaranteed, which can prevent the result adverse to the user's intention.

In a third aspect of the present invention, an application orders a processor to perform the steps of:

(a) determining whether a memory key as a removable memory is coupled to coupling means;

(b) if the determination is positive, reading key classification information from the memory key and making authentication depending on whether key classification information indicates a trial key or a license key;

(c) if a result of the authentication is successful, obtaining a trial time limit by adding a trial permission period indicated by the trial permission period information to the current time, and storing the trial time limit in the trial information storing means; and (d) if the current time does not exceed the trial time limit or the authentication of the license key is successful, executing the optional routine following an instruction from the instruction inputting means.

According to the above configuration, when a user desires to make a trial of optional function, the user can do it by coupling the trial key to the coupling means. If the user likes the optional function, the user has only to purchase the license key and couple it to the coupling means. Thereby, the operations are unified as well as simple, because a smooth transition from the trial program to the perpetual license use is ensured.

In a forth aspect of the present invention, an application orders a processor to perform the steps of:

(a) executing authentication according to an input of trial permission information or license information;

(b) if the authentication of the trial permission information is successful, obtaining a trial time limit by adding a trial permission period indicated by the trial permission period information to the current time, and storing the trial time limit in the trial information storing means;

(c) if the current time exceeds the trial time limit or the authentication of the license key is successful, having the trial state information indicate "trialed"; and (d) if the authentication of the license information is successful, or the authentication of the trial permission information is successful and the trial state information does not indicate "trialed", executing the optional routine following an instruction from the instruction inputting means, wherein the optional routine orders the processor:

(e) to display the trial time limit on display means if the trial state information does not indicate "trialed".

With the above configuration, a trial period is indicated on the display means during the trial period. If the use by license starts during the trial period, the trial period is not displayed on the display means, which ensures a smooth transition from the trial to the perpetual license use.

Other aspects, objects, and the advantages of the present invention will become apparent from the following detailed description taken in connection with the accompanying drawings.

BRIEF DESCRIPTION OF THE DRAWINGS

FIG. 2A is a flowchart showing a process started by pressing a job start key after the process of FIG. 1;

FIG. 2B is a flowchart showing an optional routine being executed or not;

FIG. 2C is a flowchart showing a part of the process within the optional routine;

FIG. 3A is an illustration of information stored in a nonvolatile memory of FIG. 7;

FIG. 3B is an illustration of information stored in a nonvolatile memory of a trial key or a license key of FIG. 1;

DESCRIPTION OF THE PREFERRED EMBODIMENT

Figure 1:
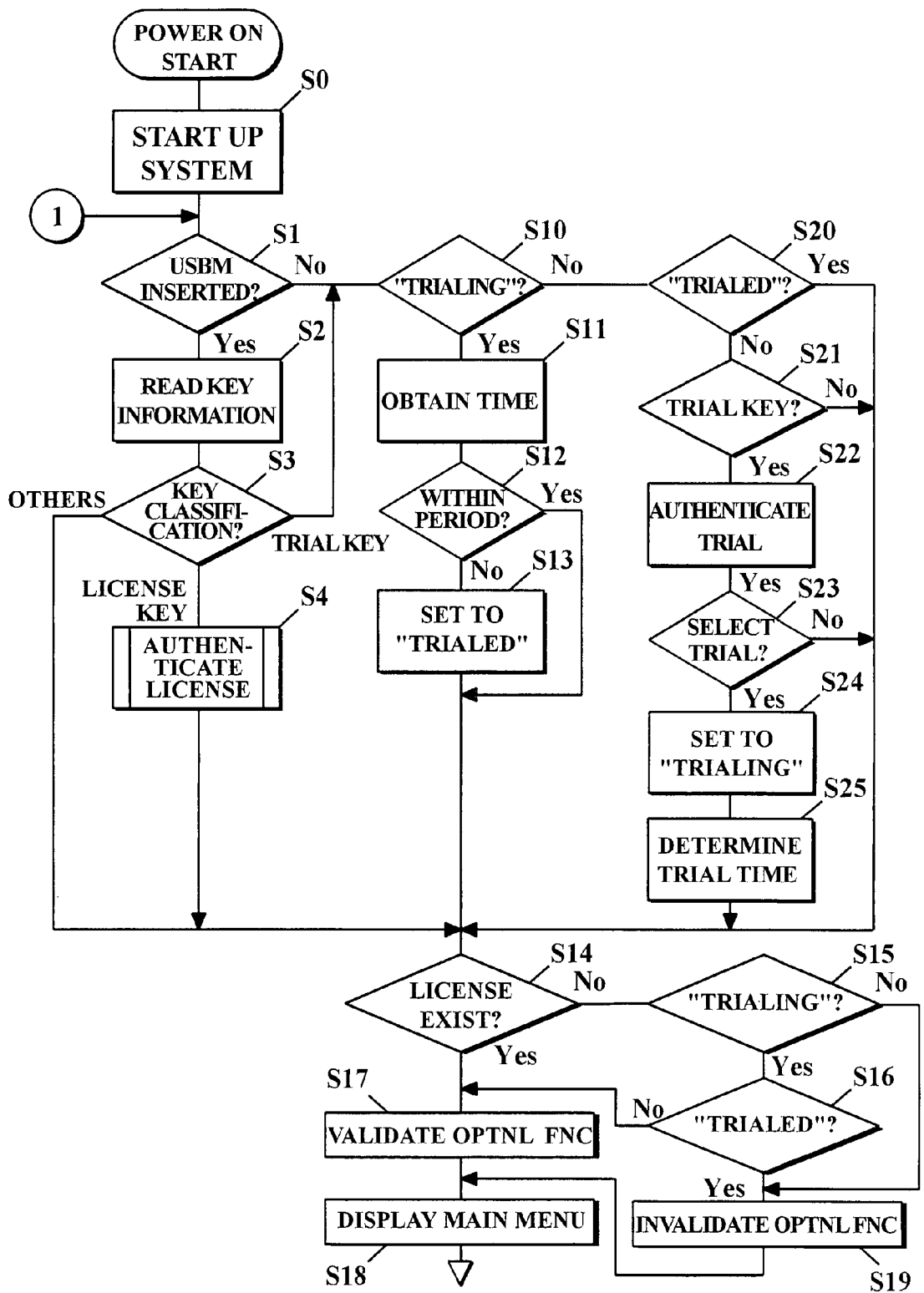
FIG. 1 is a flowchart showing a process started by supplying power to an image forming apparatus, of an embodiment according to the present invention.

Referring now to the drawings, wherein like reference characters designate like or corresponding parts throughout several views, preferred embodiment of the present invention will be described below.

Figure 7:
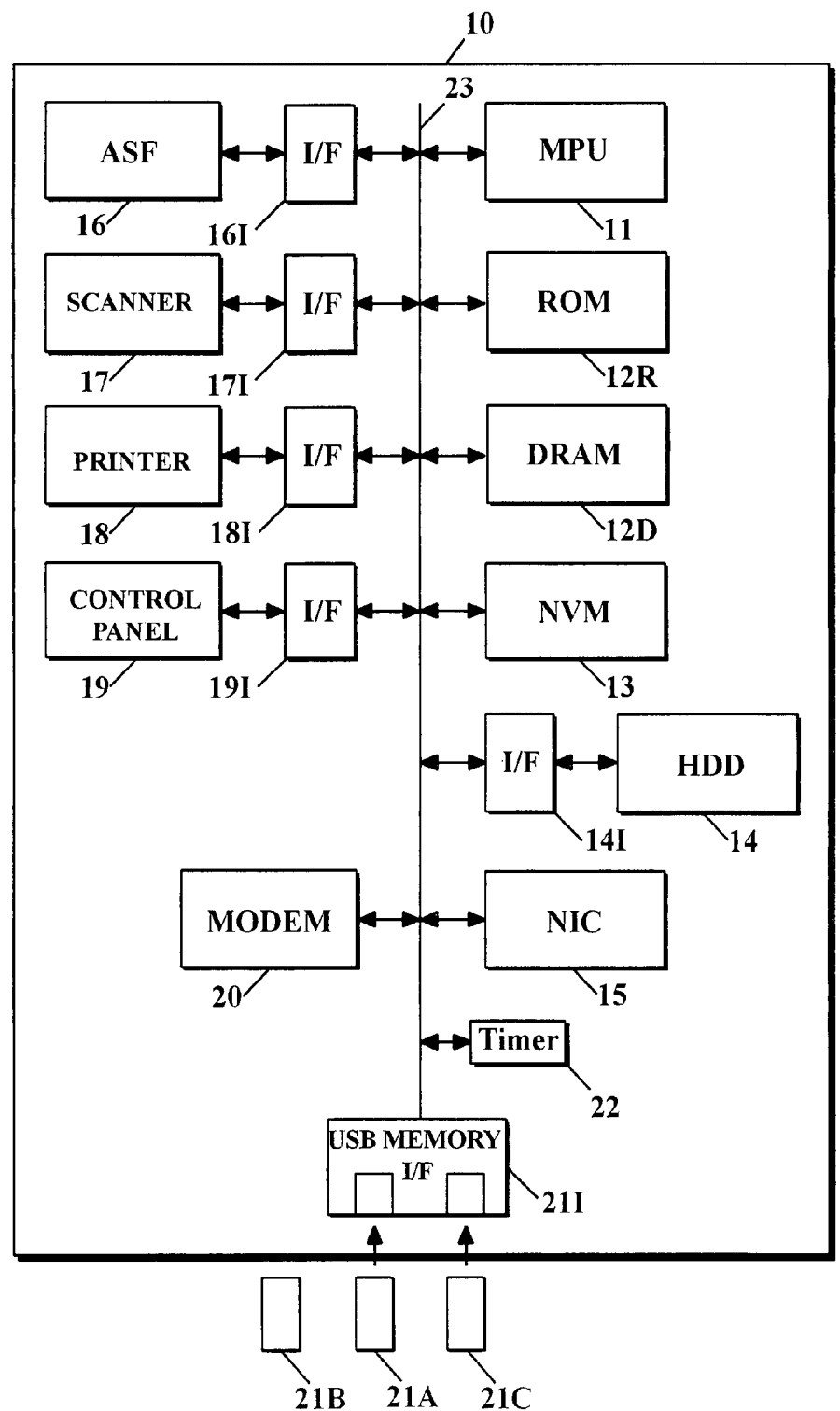
FIG. 7 is a schematic block diagram of an image forming apparatus of an embodiment according to the present invention

FIG. 7 shows a schematic block diagram of an image forming apparatus 10 of an embodiment according to the present invention.

In the image forming apparatus 10, an MPU (Micro Processing Unit) 11, a ROM 12R, a DRAM 12D, a nonvolatile memory 13, a NIC 15, a modem 20, interfaces 14I, 16I to 19I, a Universal Serial Bus (USB) memory interface 21I, and a timer 22 are coupled through a bus 23. The interfaces 14I, 16I to 19I are coupled to a HDD 14, a sheet feeder 16, a scanner 17, a printer 18, and a control panel 19, respectively.

The ROM 12R stores an operating system (OS), an application operating at an upper layer of the OS, and various device drivers operating at a lower layer of the OS. The DRAM 12D is used as a main memory. An example of the nonvolatile memory 13 is a flash memory. The nonvolatile memory 13 can be electrically rewritten. The nonvolatile memory 13 stores a boot strap, trial state information US ("information" in the present specification and claims includes a code; the rest is the same below), a trial time limit, and a trial permission period. The HDD 14 is used for storing data. This application is to operate the image forming apparatus as a multi-functional device. Copying, scanning, printing, and faxing are functions of the multi-function peripherals.

The NIC 15 is coupled to a host computer on a network, and used to perform print jobs. The scanner 17 operates with the auto sheet feeder 16 simultaneously to perform an image input, and is used in copy and fax transmission jobs. The printer 18 is equipped with a print engine, a fixing unit, a feeding unit, carriers, and a unit of discharging sheets. The printer 18 forms an electrostatic latent image on a photoconductive drum of the print engine based on bitmap data supplied as a print data, develops the electrostatic latent image with a toner, transfers and fixes the toner image on a sheet, and discharges the sheet. The control panel can be equipped with a touch panel and hardware keys, and can input setting information or an instruction and display a select screen or a setting screen, etc. The modem 20 is for transmitting and receiving facsimiles. The USB memory interface 21I is equipped with at least two ports for inserting a trial key 21A or a license key 21B as a memory key, or a USB memory 12C as a file storing means. The timer 22 indicates a current time and/or date.

In the above application, the optional routine is initially equipped in a main body program. As shown in FIG. 2B, if a optional function valid flag (hereinafter referred to as a "valid flag") of the trial state information US shown in FIG. 3A is '1' in a step Sa, that is, the optional function is valid, the application proceeds to a step Sb to execute the optional routine. If the optional function is invalid, the routine is not executed.

Figure 6A:
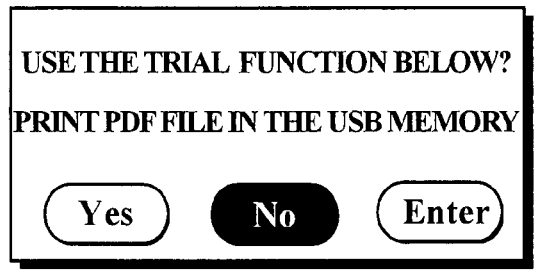
FIG. 6A to 6E illustrations showing screens on a control panel for explaining the processes of step 22 and 18 of FIG. 1.
Figure 6B:
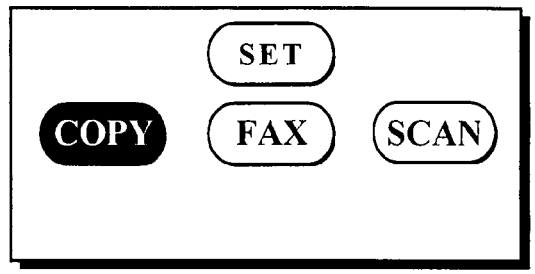

For example, FIG. 6B shows a main menu when the optional routine is not executed. Further, when the optional routine is executed, a PDF (Portable Document Format) PRINT button is displayed as shown in FIG. 6E. If this button is pressed, a corresponding process is started according to the event driven scheme. In the present embodiment, when the USB memory 21C is inserted in a port of the USB memory interface 21I as in FIG. 7, PDF files in the USB memory 21C is automatically loaded to the DRAM 12D to converter to bitmapped data, which is provided to the printer 18, resulting in printing the contents on a sheet, by the optional routine.

This optional routine is activated as the valid flag is changed to '1' by inserting the trial key 21A or the license key 21B into a port of the USB memory interface 21I. In other words, the optional routine is in an executable state, which means, the process proceeds from the step Sa to the step Sb in FIG. 2B in job's execution.

Both the trial key 21A and the license key 21B are USB memory keys equipped with nonvolatile memories such as a flash memory chip, and as shown in FIG. 3A, at predefined addresses thereof there are stored key classification information "K", which indicates whether it is a trial key or a perpetual license key, and encrypted authenticated information "X".

Preferably, the key classification information "K" is a code with a small probability to be conformed to general data. The authenticated information "X" is stored in a copy protect region. When reading data in the region, the stored data is read in an encrypted form. Therefore, even if a person copies this data, the person does not know the meaning of the data as long as the person does not have a secret key. In contrast to this, the key classification information "K" is stored in a general region because copying or changing it makes no meaning.

In FIG. 3A, a first bit (the lowest level bit) of the trial state information US is a flag (hereinafter referred to as "trialing flag") that indicates "trialing" when the first bit is '1', and indicates "non-trial" when the first bit is '0'. A second bit is a flag (hereinafter, referred to as "trialed flag") that indicates "trialed" when the second bit is '1', and indicates "untrialed" when the second bit is '0'. A third bit is a flag (hereinafter, referred to as "license flag") that indicates "licensed" when the third flag is '1', and indicates "no license" when the third bit is '0'. Each bit of the trial state information US is set to 0 when originally shipped from a factory.

FIG. 1 shows a flow chart started by supplying power to an image forming apparatus 10.

While a general image forming apparatus without the trial key 21A and the license key 21B includes only a step S0 and a step S18, the present embodiment further includes steps S1 to S4, SIC to S17, S19, and S20 to S25. These steps are put between the step S0 and the step S18.

Depending on user's work contents, the user may or may not desire to try the optional function, and the trial permission period of the optional function is limited to a certain period, such as 10 days. Thus, only when a user desires to try the optional function, the user inserts the trial key 21A in the USB memory interface 21I and then supplies power to the image forming apparatus. In this case, a process of the steps S0 to S3, S20 to S25, and S14 to S18 is performed as follows. Symbols in parenthesis are step identifying symbols in the drawings.

(S0) The boot strap, the OS, and the application are started in this order, and the process prior to displaying the main menu is executed.

(S1 to S3) If the USB memory is inserted in any one port of the USV memory interface 21I, the data of the address at which the key classification information "K" and the authenticated information "X" are stored is read from the USB memory. If the key classification information "K" indicates the trial key, it proceeds to the step S10.

(S10) Since the trialing flag of the trial state information US is assumed to be '0' and the key classification information "K" indicates the trial key at an initial state, the process proceeds to the step S22.

(S22) As shown in FIG. 6A, the screen indicating an inquiry whether it makes a trial of optional function and contents of the optional function are displayed on the control panel 19. In FIGS. 6A to 6E, a reversely displayed button indicates that the button is selected. At an initial state, "No", or not making a trial of the optional function, is selected.

If an 'Enter' key is pressed in this state, the process proceeds to the step S19 though the steps S23, S14, and S15, and the valid flag of the trial state information US is set to '0'. Then the process continues to proceed to the step S18 to display the main menu as shown in FIG. 6B.

Figure 6C:
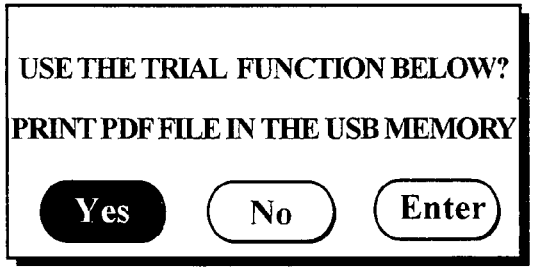
Figure 6D:
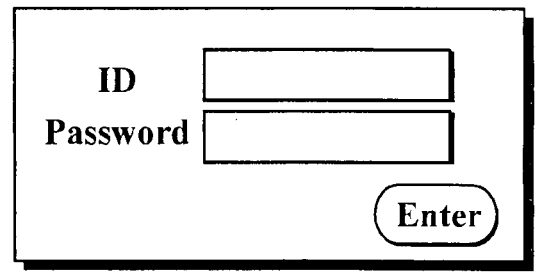
Figure 6E:
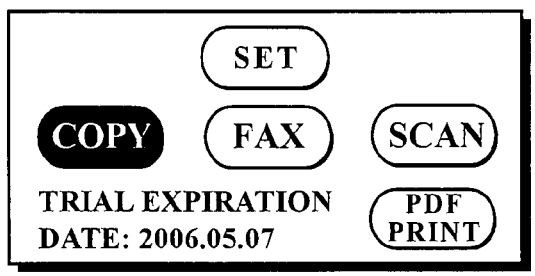

If the 'Yes' key is pressed in the state of FIG. 6A, the process proceeds to the state of FIG. 6C. If the 'Enter' key is pressed again subsequently, an input screen of an ID and a password is displayed on the control panel 19 as shown in FIG. 6D. If the ID and the password shown in the description of the trial key 21A are input, the process proceeds to the step 24 through step S23.

(S24) This step makes the trialing flag of the trial state information US '1'.

(S25) This step reads current time from the time 22 and adds the trial permission period stored in the nonvolatile memory 13 to it, in order to determine the trial period, and then stores the determined trial period in a predefined address of the nonvolatile memory 13.

(S14 to S16) Though the process has not confirmed a license yet at this point, since the trialing flag is set to the "trialing" (not the "trialed") in the step S24, the process proceeds to the step S17.

(S17) The valid flag (the highest level bit) of the trial state information US is set to '1'.

(S18) This step includes the process of FIG. 2B. Since the step Sb is executed as described above, a "PDF PRINT" button of the optional function is displayed as shown in FIG. 6E. The step Sb includes the process shown in FIG. 2C, and since the trialed flag of the trial state information is '0', the test period in the step Sb2 is displayed as shown in FIG. 6E.

In the state of FIG. 6E, if any one of the function keys is pressed, the key is reversely displayed. If the reversely displayed key is pressed, the process of the step S30 shown in FIG. 2A is executed so that the function is executed. Then, the license flag is set to '0' in the step S31, returning to the step S31 of FIG. 1.

Subsequently, the process proceeds to the step S15 through the steps S2 and S3, and the trialing flag of the trial state information US is determined to be '1'. Current time is read from the timer 22 in the step 11, and compared with the trial period in the nonvolatile memory 13 in the step S12. If the comparison verifies that the current time is still within the trial period, the screen shown in FIG. 6E is displayed on the control panel 19 in the step S18 through the steps S14 to S17.

In the step S1, if the process determines that the USB memory is not inserted in a port of the USB memory interface 21I, the process proceeds to the step S10. Hence, after selecting the trial function in the step S22, inserting the trial key 21A in a port of the USB memory interface 21I is not necessary.

If the trial period is determined to have ended in the step S12, the trialed flag of the trial state information US is set to '1' in the step S13. Then, the process proceeds to the step S14.

Since the image forming apparatus 10 has a facsimile-receiving function, a power source usually stays turned on unless a power failure or other special situations occurs. However, since the process returns to the step S1 of FIG. 1 every time a job is terminated, the trialed flag of the trial state information US is set to '1' once the trial period ends. The process proceeds to the steps S14 to S16 and S19, with the valid flag of the trial state information US set to '0' to proceed to the step S18, and a main menu without the trial function shown in FIG. 6B is displayed on the control panel 19.

With the process described above, even if the trial period ends during job execution (but after selecting the job within the trial period), the execution of the job is ensured; at the same time, the trial function will not be able to be used next time.

In a situation where a power source of the image forming apparatus 10 is turned on after turned off, if the trialing flag of the trial state information US is '1', the process of the steps S10 to S12 of FIG. 1 is executed regardless of whether the USB memory is inserted. In the same situation, if the trial period is determined to have ended in the step S12, the trialed flag of the trial state information US is set to '1' in the step S13. Therefore, a proper process is executed depending on whether the trial permission period has ended before selecting a job or not.

Figure 4:
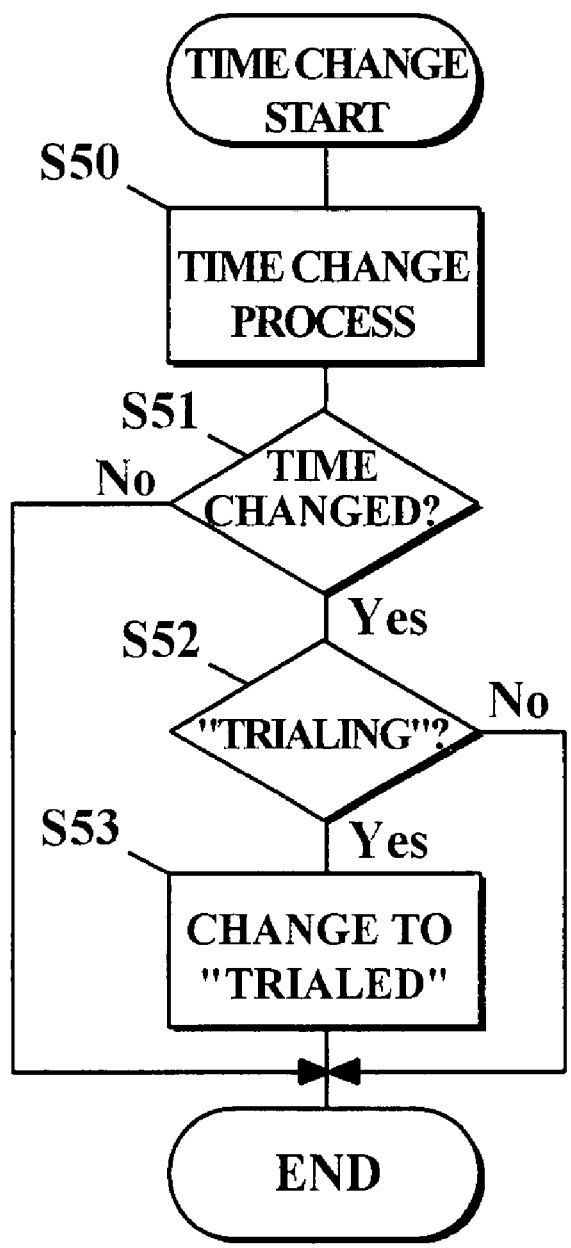
FIG. 4 is a flowchart showing a time changing process.

FIG. 4 shows a time changing process. This process is initiated by using the control panel 19 to press a time changing button (not shown in the figure). Though the conventional embodiment only has a step S50, the present embodiment further includes steps S51 to S53 as well as the step S50.

(S50) A general time changing process is executed.

(S51) If the time is changed in the step S50, the process proceeds to a step S52; otherwise, the process of FIG. 4 ends.

(S52) The process proceeds to a step S53 if the trialing flag of the trial state information US is '1'; otherwise, the process of FIG. 4 ends.

(S53) The trialed flag is set to '1'.

The process described above not just prevents extending the trial permission period by changing time settings, but rather, shortens the trial permission period. Therefore, undue manipulation of extending the trial permission period can be prevented beforehand.

If the step S52 verifies that the optional function is not "trialing", that is, if the trial key 21A has not been used yet, time changing process has no effect on a next trial since the process skips the step S53.

The above process is possible by distinguishing the "trialing flag" and the "trialed flag". Further, with this distinction, the process moves on from the step S10 to the step S11 as long as the flag is "trialing" even if not "trialed". Therefore, it is unnecessary to insert the trial key 21A in a port of the USB memory interface 21I after selecting trial function in the step S22.

Also, since the trial state information US is stored in the nonvolatile memory 13 rather than in the trial key 21A, the process cannot proceed from the step S20 to the step S22 through the step S21 even if another trial key 21A is inserted after the trial period ends. Accordingly, the trial period cannot be unduly extended.

Further, the trial key 21A is used just when a user desires to try the optional function. This can result in increased profits for vendors, as well as improved convenience for users, since a probability of the user's purchasing the license key 21B increases after using the trial key 21A.

Next, a process when the license key 21B is inserted in the port of the USB memory interface 21I will be described below.

In this case, if power is supplied to the image forming apparatus 10, the steps S0 to S3 are executed as foregoing description. If the key classification information "K" shows the license key, the process proceeds to the step S4.

Figure 5:
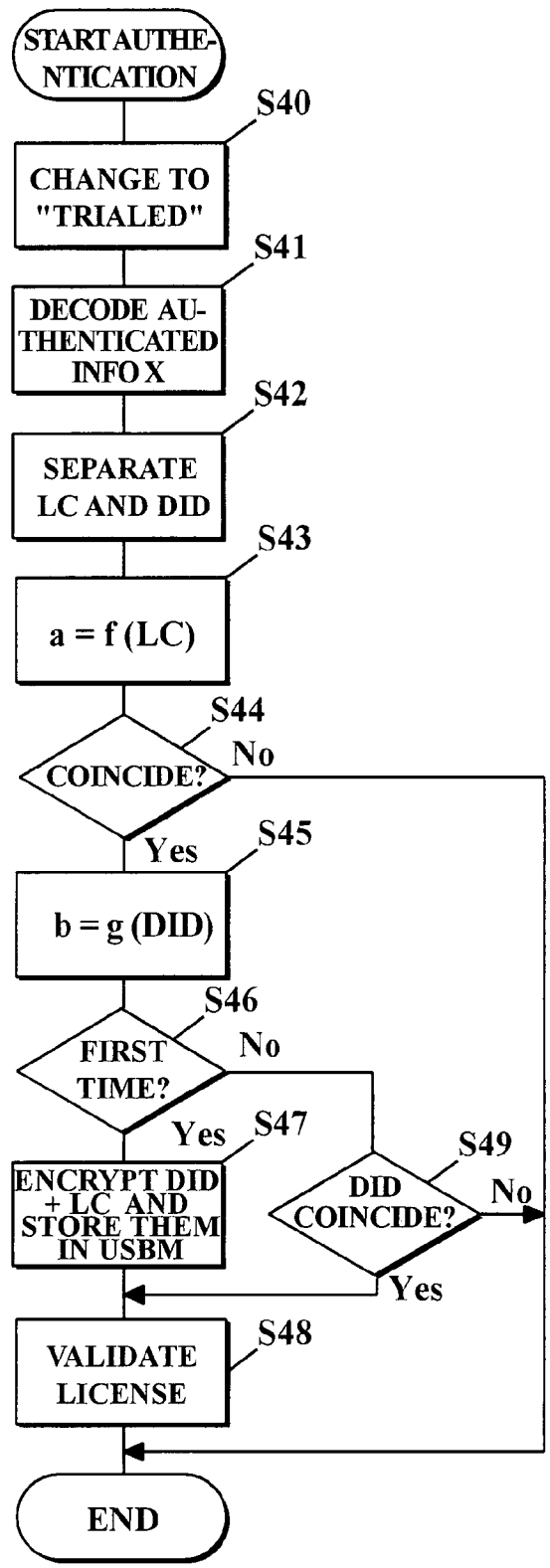
FIG. 5 is a detailed flowchart showing the process of step S4 of FIG. 1.

FIG. 5 shows a detailed flow chart of the process of this step S4.

(S40) The "trialed" flag of the trial state information US is set to '1'. By this, if a user has a license, the trial period indication in the step Sb2 of FIG. 2C will not be shown. The process with a license key differs from the process with the trial key in this aspect.

(S41) Authenticated information "X" in the USB key 21B is decoded.

(S42) Since the decoded information contains a combination of license information (LC) and device identification information (DID), separate these two sets of the information. This combination may be a simple serial combination. An initial value of the device identification information (DID) is irrelevant to a unique device ID, and defined as below.

(S43) a=f(LC) is obtained by substituting a predefined function f with the license information (LC).

(S44) The process proceeds to a step S45 if the value "a" conforms to a predefined value; otherwise, the process of FIG. 5 ends. In other words, the license information (LC) and the function f are defined to correspond to the predefined value "a" if the license information (LC) is authenticated information. This predefined value is stored in the nonvolatile memory 13 in an encrypted form, and decoded before judging the conformity.

(S45) b=g(DID) is obtained by substituting a predefined function g with the device identification information (DID).

(S46) The process proceeds to a step S47, judging the action is performed for a first time, if the value b conforms to the predefined value b0; otherwise, the process proceeds to the step S49. In other words, the device identification information (DID) and the function q are defined to correspond to the value b0, which is predefined by the value b, if the device identification information (DID) is an initial value, and the value b is defined not to correspond to the value b0 if the device identification information (DID) is not an initial value. For example, a value whose bit number is different from that of the device identification information (DID) is used as an initial value of the device identification information (DID). This predefined value b0 is stored in the nonvolatile memory 13 in an encrypted form, and decoded before judging the conformity.

(S47) This step reads a unique ID of the predefined device, such as an ID of a CPU or a manufacturing number and uses the unique ID as new device identification information (DID). A combination of the device identification information (DID) and the license information (LC), which is combined so as to be separated in the step S42, are encrypted and stored in the USB key 21B as the authenticated information "X".

(S48) The license flag of the trial state information US is set to '1', and the process of FIG. 5 ends.

(S49) The predefined device identification information is read. If the read predefined device identification information matches with the device identification information (DID) separated in the step S42, the license key 21B is determined not to have been used in other image forming apparatuses. Further, since the step S44 has determined the license information (LC) is authentic information and the license key 21B is assumed to be authentic, the process proceeds to the step S48; otherwise, the process of FIG. 5 ends.

Following this process, an undue use of the license key 213 can be prevented. Further, regardless of whether a power source of the image forming apparatus is turned on or off, the license flag is set to '0' every time a job is terminated and the license authentication is executed in the step S4 through the steps S1 to S3. If the license key 21B is not inserted in a port of the USB memory interface 21I, the process proceeds from the step S1 to the step S10, followed by one of the sets of the steps of: S11, S14, S15, S16, S19: S20, S14, S15, S16, S19:

S11, S14, S15, S19, or: S20, S14, S15, S19. Through these steps, the valid flag is set to '0'. Thus, the optional function cannot be executed, more reliably preventing an undue use of the license key 21B.

Further, similar to the license key 21B, the trial key 21A is also configured of the USB memory. Using the optional function only requires inserting a key, whether it is the perpetual license key or the trial key, in a port. This ensures an easy transition between a trial use and a perpetual use.

Although preferred embodiment of the present invention has been described, it is to be understood that the invention is not limited thereto and that various changes and modifications may be made without departing from the spirit and scope of the invention.

For example, while the trial start information can be easily input by inserting the USB memory as the memory key in a port in the embodiment as described above, one consideration can be a configuration that displays the trial start key on the control panel 19 to input the trial start information. Similarly, another consideration can be a configuration in which pressing multiple keys which are not frequently used on the control panel, such as a copy key, a fax key, or a scan key of the FIG. 6E, inputs the trial start information.

Since an object of the present invention is to limit and manage the trial period properly, another modification can be a configuration in which a user can try the optional function without using the trial key from the beginning.

Further, while the above examples of the embodiments of the present invention describe the configurations which use the USB memory as a removable memory, other configurations using a different removable memory, such as a hard disk card or an SD card, and an interface corresponding to the removable memory can also be considered.

The trial period may include a date as well as time.

Further, a configuration can be one that encrypts all or a portion of the information, in particular, the trial state information, shown in FIG. 3A (A), stores the encrypted information in the nonvolatile memory 12, and decodes it when using.

Further, although the foregoing embodiments assumed the image forming apparatus as a multifunction peripherals, the present invention can be applied to an image forming apparatus with a single function.

What is claimed is:

1. An image forming apparatus forming an image on a sheet supplied, comprising:
a processor;
program storing means, coupled to the processor, for storing an application including an optional routine; and
control panel means, coupled to the processor, having instruction inputting means and display means,
wherein the image forming apparatus further comprising:
trial start information inputting means; and
a trial information storing means, coupled to the processor, for storing trial limitation information indicating trial state information and either a trial permission period or a trial permission number,
wherein the application orders the processor to perform the steps of:
(a) determining whether the trial start information is input;
(b) executing the optional routine according to an instruction from the instruction inputting means if the determination at the step (a) is positive and the trial state information does not indicate "trialed"; and
(c) determining whether an attempted trial exceeds the limitation indicated by the trial limitation information, and if the determination is positive, having the trial state information indicate "trialed".

2. The image forming apparatus according to claim 1, further comprising a clock outputting a current time;
wherein the trial limitation information has the trial permission period,
wherein the application orders the processor:
in the step (a), if the determination is positive, to obtain a trial time limit by adding the trial permission period to the current time, and to store the trial time limit in the trial information storing means; and
in the step (c), to determine whether the attempted trial exceeds the limitation indicated by the trial limitation information, depending on whether the current time has passed the trial time limit.

3. The image forming apparatus according to claim 1, wherein the trial limitation information has the trial permission number,
wherein the application orders the processor:
in the step (b), to substantially store a trial number of times of the optional routine as a part of the trial state information into the trial information storing means; and
in the step (c), to determine whether the attempted trial exceeds a limitation indicated by the trial limitation information depending on whether the trial number of times of the optional routine is above the trial permission number.

4. The image forming apparatus according to claim 2, wherein the trial start information inputting means has: a coupling means to be coupled with a removable memory; and an interface for the removable memory, coupled in between the coupling means and the processor; and
the step (a) comprises the steps of:
(a1) determining whether the memory key is coupled to the coupling means;
(a2) if the determination is positive, reading authenticated information from the memory key, and if the authenticated information is determined to be valid, assuming that the trial start information is input.

5. The image forming apparatus according to claim 4, wherein the application orders the processor:
in the step (a2), if it is determines that the authenticated information is regular information, to have the trial state information indicate "trialing";
to determine, prior to the step (a2), whether the trial state information is the "trialing", and if the determination is positive, to proceed to the step (c); and
if the trial state information indicates "trialing" and does not indicate "trialed", to execute the optional routine following an instruction from the instruction inputting means.

6. The image forming apparatus according to claim 5, wherein the application orders the processor:
in the step (a2), if it is determined that the authenticated information is regular information, to display, on the display means, the function of the optional routine and an inquiry of where the user desires to use the function; and
to determine that the trial start information is input if the instruction from the instruction inputting means indicates the use of a trial of the function.

7. An image forming apparatus forming an image on a sheet supplied, comprising:
a processor;
program storing means, coupled to the processor, for storing an application including an optional routine;
instruction inputting means coupled to the processor; and
a clock outputting current time,
wherein the image forming apparatus further comprising:

trial information storing means, coupled to the processor, for storing trial time limit information and trial state information, wherein the application orders the processor to perform the steps of:
(a) updating the trial state information based on a comparison of a trial time limit indicated by the trial time limit information and the current time, between a start of the application and a start of a job, and every time a job is terminated; and
(b) executing an optional routine following an instruction from the instruction inputting means if the trial state information indicates "valid".

8. The image forming apparatus according to claim 7, wherein the application orders the processor:
in the step (a), to have the trial state information indicate "trialed" if a result of the comparison indicates an elapse of the trial time limit, and to have the trial state information indicate "valid" if the result of the comparison indicates "before the trial time limit" and does not indicate "trialed".

9. The image forming apparatus according to claim 8, wherein the application further orders the processor:
to change settings of current time of the clock means following an instruction from the instruction inputting means, and if the trial state information indicates "trialing", to have the trial state information indicate "trialed".

10. The image forming apparatus according to claim 8, further comprising trial start information inputting means inputting trial start information, and
wherein the application further orders the processor:
to determine, prior to the step (a), whether the trial start information is input, and if the determination is positive, to proceed to the step (a).

11. The image forming apparatus according to claim 10, wherein the trial start information inputting means has: a coupling means to be coupled with a removable memory constituting a memory key; and an interface for the removable memory, coupled in between the coupling means, wherein the step(c) comprises the steps of:
(c1) determining whether the memory key is coupled to the coupling means; and
(c2) if the determination is positive, reading authenticated information from the memory key, and if the authenticated information is determined to be regular information, assuming that the trial start information is input.

12. The image forming apparatus according to claim 11, wherein the application orders the processor:
in the step (c2), to have the trial state information indicate "trialing" if the authenticated information is determined, to be regular information; and
prior to the step (c2), to determine whether the trial state information is "trialing", and if the determination is positive, to proceed to the step (c).

13. The image forming apparatus according to claim 12, further comprising display means coupled to the processor, wherein the application, in the step (c2), orders the processor:
if the authenticated information is determined to be regular information, to display, on the display means, function of the optional routine and an inquiry of whether a user desires to use the function; and
if the instruction from the instruction inputting means indicates the user of the function, to determine that the trial start information is input.

14. An image forming apparatus forming an image on a sheet supplied, comprising:
a processor; and
program storing means, coupled to the processor, for storing an application including an optional routine,
wherein the image forming apparatus further comprising:
clock means outputting a current time;
instruction inputting means coupled to the processor;
trial information storing means, coupled to the processor, for storing trial permission period information;
coupling means to be coupled with a removable memory; and
an interface for the removable memory, coupled in between the coupling means and the processor,
wherein the application orders the processor to perform the steps of:
(a) determining whether a memory key as the removable memory is coupled to the coupling means;
(b) if the determination is positive, reading key classification information from the memory key and making authentication depending on whether the key classification information indicates a trial key or a license key;
(c) if a result of the authentication is successful, obtaining a trial time limit by adding a trial permission period indicated by the trial permission period information to the current time, and storing the trial time limit in the trial information storing means; and
(d) if the current time does not exceed the trial time limit or the authentication of the license key is successful, executing the optional routine following an instruction from the instruction inputting means.

15. The image forming apparatus according to claim 14, wherein the trial information storing means further stores trial state information,
wherein the step (d) comprises the steps of:
(d1) having the trial state information indicate "valid" if the current time is not exceed the trial time limit or the authentication of the license key is successful; and
(d2) executes the optional routine following an instruction from the instruction inputting means if the trial state information indicates "valid".

16. The image forming apparatus according to claim 15, wherein the step (d1) comprises the steps of:
(d11) having the trial state information indicate "trialed" if the current time exceeds the trial time limit; and
(d12) having the trial state information indicate "valid" if the trial state information does not indicate "trialed" or the authentication of the license key is successful,
wherein the application further orders, in the step (b), the processor to have the trial key not to be authenticated if the trial state information indicates "trialed".

17. The image forming apparatus according to claim 16, wherein the application further orders the processor:
in the step (c), to have the trial state information indicate "trialing";
if the determination is negative in the step (a) and the trial state information indicates "trialing", to proceed to the step (d11), and after processing the step (d11), if the trial state information indicate "trialing", to proceed to the step (d12).

18. The image forming apparatus according to claim 17, further comprising display means coupled to the processor,
wherein the application further orders the processor, in the step (b), to have the trial state information indicate "trialed" if the key classification information indicates the license key,
wherein the optional routine orders the processor to display the trial time limit on the display means if the trial state information does not indicate "trialed".

19. The image forming apparatus according to claim 18, wherein the application further orders the processor, following an instruction from the instruction inputting means, to change settings of the current time of the clock means, and to have the trial state information indicate "trialed" if the trial state information indicates "trialing".

20. An image forming apparatus forming an image on a sheet supplied, comprising:
    a processor; and
    program storing means, coupled to the processor, for storing an application including an optional routine,
    wherein the image forming apparatus further comprising:
    clock means outputting a current time;
    control panel means, coupled to the processor, equipped with instruction inputting means and display means;
    permission information inputting means selectively inputting use permission information or license information; and
    trial information storing means, coupled to the processor, for storing trial permission period information and trial state information,
    wherein the application orders the processor to perform the steps of:
    (a) executing authentication according to an input of the trial permission information or the license information;
    (b) if the authentication of the trial permission information is successful, obtaining a trial time limit by adding a trial permission period indicated by the trial permission period information to the current time, and storing the trial time limit in the trial information storing means;
    (c) if the current time exceeds the trial time limit or the authentication of the license key is successful, having the trial state information indicate "trialed"; and
    (d) if the authentication of the license information is successful, or the authentication of the trial permission information is successful and the trial state information does not indicate "trialed", executing the optional routine following an instruction from the instruction inputting means,
    wherein the optional routine orders the processor:
    (e) to display the trial time limit on the display means if the trial state information does not indicate "trialed".

21. The image forming apparatus according to claim 20, wherein the application further orders the processor:
    in the step (b), to have the trial state information indicate "trialing"; and
    in the step (a), if neither the trial permission information nor the license information is not input and the trial state information indicates "trialing", to proceed to the step (c), and after processing the step (c), to assume the authentication of the trial information has been successful in the step (d).

22. The image forming apparatus according to claim 21, wherein the step (d) comprises the steps of:
    (d1) having the trial state information indicate "valid" if the authentication of the license information is successful, or the authentication of the trial permission information is successful and the trial state information does not indicate "trialed"; and
    (d2) executes the optional routine following an instruction from the instruction inputting means if the trial state information indicates "valid".

23. The image forming apparatus according to claim 22, wherein the application further orders the processor, following an instruction from the instruction inputting means, to change settings of current time of the clock means and if the trial state information indicates "trialing", to have the trial state information indicate "trialed".

24. The image forming apparatus according to claim 20, wherein the permission information inputting means has: a coupling means to be coupled with a removable memory; and an interface for the removable memory, coupled in between the coupling means and the processor.

* * * * *